United States Patent Office 3,047,599
Patented July 31, 1962

3,047,599
PROCESS FOR THE PRODUCTION OF MIXTURES OF ISOMERIC ALIPHATIC OR CYCLOALIPHATIC CARBOXYLIC ACIDS HAVING MOLECULAR SIZES OF FROM $C_5$ TO $C_{10}$
Karl Büchner, Oberhausen-Sterkrade, and Hans Tummes, Oberhausen-Sterkrade-Nord, Germany, assignors to Ruhrchemie Aktiengesellschaft, Oberhausen-Holten, Germany, a corporation of Germany
No Drawing. Filed Dec. 17, 1959, Ser. No. 860,094
Claims priority, application Germany Dec. 22, 1958
19 Claims. (Cl. 260—413)

This invention relates to the synthesis of aliphatic or cycloaliphatic acids by the oxidation of aliphatic or cycloaliphatic aldehydes, obtained by catalytically adding carbon monoxide and hydrogen to aliphatic or cycloaliphatic olefins of $C_5$ to $C_9$ molecular size. More particularly, this invention relates to the synthesis of mixtures of isomeric aliphatic carboxylic acids by oxidation of liquid-phase aliphatic or cycloaliphatic aldehydes, which aldehydes have been obtained by catalytically adding carbon monoxide and hydrogen to aliphatic or cycloaliphatic olefins of $C_4$ to $C_9$ molecular size.

The prior art is replete with descriptions of processes concerning the reaction of various organic compounds, such as olefins, alcohols, ethers and esters, and the like, with carbon monoxide and steam. The prior art describes the use of various and numerous different types of catalysts, whereby the addition of a carbon atom to the organic compounds of the type indicated is caused to take place with the resultant formation of a carboxyl compound, such as an acid. In further detail, there are numerous prior art descriptions outstanding respecting the reaction of ethylene, propylene and the like with carbon monoxide and steam, these reactions being described as carried out in the presence of many varieties of catalysts ranging from charcoal on the one hand to inorganic acids on the other. These descriptions indicate that such reactions give propionic acid or similar carboxyl compound.

While from these numerous disclosures in the prior art it is apparent that a carbon atom may be added to various sources of other carbon atoms for obtaining carboxyl compounds, as far as we are aware the yields of reaction products and certain other aspects have not been favorable. Some of these prior art disclosures do not even set forth the yield of carboxyl compound. Or, in checking the described prior art process with the prior art catalyst, it has been found that only low yields are obtained in the reaction, and other disadvantages have been encountered. It appears that the prior art approach to the specification of a catalyst for reactions of the class indicated has been somewhat empirical and at random. Consequently, processes in which substantial yields are obtained and in which reasonably sustained operation may be accomplished do not appear to have been described in the prior art.

There is also considerable prior art outstanding, in which there has been described the production i.e. $C_8$ to $C_{10}$ aliphatic or cycloaliphatic carboxylic acids by the oxidation of the corresponding aldehydes, either in the vapor phase or in the liquid phase, by means of catalysts, the aldehyde having been obtained by dehydrogenation of the corresponding alcohol. The aforementioned type of process using the catalyst involved a rather complicated procedure and left a great deal to be desired with respect to control of the reaction conditions and yields of carboxyl compounds obtained.

This invention has for one object to provide an improved process for the manufacture of mixtures of isomeric aliphatic or cycloaliphatic carboxylic acids having molecular sizes of from $C_5$ to $C_{10}$ from olefins, carbon monoxide and hydrogen.

Another object is to provide a process of the class indicated, in which the resultant mixture of aldehydes obtained by catalytically adding carbon monoxide and hydrogen to aliphatic or cycloaliphatic $C_4$ to $C_9$ olefins may be oxidized in the liquid phase to the $C_5$ to $C_{10}$ isomeric aliphatic or cycloaliphatic carboxylic acids.

Still another object is to provide a process for the liquid-phase oxidation of the $C_5$ to $C_{10}$ aldehydes, which may be effected in the absence of oxidation catalysts.

Still another object is to provide a continuous liquid-phase process for producing $C_5$ to $C_{10}$ isomeric carboxylic acids, in which the desired acid component may be segregated from the other products present in the reaction.

Further objects will be apparent hereinafter.

These objects are accomplished in accordance with the invention. It has now been found that mixtures of isomeric aliphatic or cycloaliphatic carboxylic acids having molecular sizes of from $C_5$ to $C_{10}$ may be obtained by oxidizing, in the absence of any catalyst and in the liquid phase, an aldehyde oxo-synthesis product having from 5 to 10 carbon atoms obtained by catalytically adding carbon monoxide and hydrogen to aliphatic or cycloaliphatic olefins having molecular sizes of from $C_4$ to $C_9$. The process is characterized in that raw aldehydes of $C_5$ to $C_{10}$ molecular size are first freed from their metal content or, if desired, an aldehyde-rich fraction obtained by distillation of such a mixture is continuously passed as a thin film through empty reaction tubes or reaction tubes which have been packed with filling bodies having large surfaces. The oxidation is effected in the absence of any oxidation catalyst and with the oxidizing gas either being passed through the fixed bed of inert filling bodies or, if the empty reaction tubes are used, through a foam formed from the oxidation product and the oxidizing gas. The temperature in the interior of the reaction tubes is maintained at 65–110° C. and preferably at from 80–100° C. by appropriate cooling.

De-metallizing and purification of the raw aldehydes is effected by the hydrating treatment of the oxo product with water at an elevated temperature and an elevated pressure and may be effected in the manner described in German Patent No. 879,837. In this step, acetals which are present in the oxo product are simultaneously eliminated by the cleavage thereof. Thereafter, an aldehyde fraction which is suitable for oxidation in accordance with the invention may be obtained from the purified raw aldehyde fraction by distillation. First runnings, intermediate fractions and the distillation residue are recycled to the step for producing the aldehydes or aldehyde mixtures or are used for the production of $C_5$ to $C_{10}$ alcohols. This mode of operation ensures a particularly economical production of the aldehyde required.

The aldehydes or aldehyde mixtures obtained from the oxo synthesis of aliphatic or cycloaliphatic olefins of from $C_4$ to $C_9$ molecular size, after purification, are oxidized in the absence of any catalyst with oxygen-containing gases while the aldehyde or aldehyde mixture is in the liquid phase in form of a thin film. The thin liquid film either flows downwardly at the wall of a single oxidation tube or a plurality of oxidation tubes, combined to form a tube bundle, or is distributed in the form of a thin film within these tubes on a large-surface packing material. The volumes of aldehyde passed through these tubes are from 10% to 60% preferably from 20 to 40% by volume per hour of the reaction space.

The oxidation is only dependent upon the surface area. Therefore, the nature of the large-surface material is not critical. Materials which are suitable for the distribution of the aldehydes and aldehyde mixtures to be oxidized in accordance with the invention include large-surface or porous inorganic and/or organic materials, such as pumice, asbestos, glass wool, ceramics, porous ceramics (as for example those known under the trade name of "Sterchamol" or "Stuttgart mass"), coke, coal, cellulose, paper, cotton, cotton wool, porous synthetic resins and similar materials.

The oxidation may be effected with the oxidizing gas being passed in co-current or counter-current flow relation with the liquid aldehyde. Air, admitted in counter-current, causes the $C_5$ to $C_{10}$ aldehydes, which are already partially oxidized by contact with the air, to foam. The oxidation may, therefore, also be effected in an oxidation tube filled with a column of foam. When the liquid aldehyde is supplied by dropping the same onto the column of foam, an upper limit of the height for the column of foam can be established. In this manner, the aldehyde, as the liquid phase of the foam bubbles, moves in the reaction tube counter-currentwise with respect to the admitted oxidizing gas stream. In this manner, a particularly ideal distribution of the aldehyde as a thin liquid film is achieved.

The temperature at which the oxidation is effected is of decisive importance to the yield of isomeric $C_5$ to $C_{10}$ carboxylic acid which is obtained. The oxidation is effected at temperatures of between 80 and 110° C. At temperatures of below 80° C., the proportion of isomeric carboxylic acid recovered remains low and large amounts of non-oxidized aldehyde are present in the reaction product. The content of isomeric acid is likewise reduced when the oxidation is effected at temperatures above the optimum temperature range, due to the formation of hydrocarbons, as may be seen from Table I which shows the oxidation to be directly dependent upon the oxidation temperature of the $iC_9$ aldehyde.

TABLE I

[Starting material charged: 220 g. per hour of $C_9$ aldehyde per 880 ccm. reaction space]

| Oxidation Temperature, ° C. | Hydrocarbons, weight-percent | Nonanoic Acid, weight-percent | Untreated Aldehyde, weight-percent |
|---|---|---|---|
| 65 | 5.0 | 67.1 | 22.2 |
| 80 | 6.4 | 74.6 | 15.4 |
| 95 | 8.8 | 77.6 | 10.4 |
| 110 | 15.7 | 68.8 | 11.9 |

Thus, up to 77.6% of nonanoic acid is obtained in the optimum temperature range. In addition to the acid formed, small amounts of $C_8$ hydrocarbons are formed by cleavage of carbon monoxide. The non-oxidized aldehyde is preferably returned into the oxidation step after the separation thereof from the acid by distillation. Taking into account the quantities of aldehyde recycled to the reaction, acid yields of up to about 85% can be obtained. Similar results are obtained in the analogous production of other isomeric $C_5$ to $C_{10}$ acid mixtures.

To maintain the oxidation temperature at the desired range, an auxiliary liquid boiling between 50 and 110° C., and preferably between 75 and 100° C., may be added to the aldehyde being processed. There are preferred as such auxiliary liquids the hydrocarbons. Suitable for the production of acid mixtures $C_6$ to $C_9$ are aldehyde-hydrocarbon mixtures which are most conveniently obtained by maintaining suitable fractionation temperatures in the separation of the $C_6$ to $C_9$ aldehydes from the reaction product of the oxosynthesis operation effected with $C_5$ to $C_8$ olefins, the aldehydes distilling simultaneously with the hydrocarbons. When using $C_5$ to $C_{10}$ aldehydes, the same may also be diluted in diluents such as benzene, toluene, cyclohexane, aliphatic hydrocarbons of $C_6$ to $C_8$ molecular size used alone or in mixture with each other.

The process of the invention lends itself particularly well to integration in the commercial production of oxo alcohols $C_5$ to $C_{10}$, which, in the form of their phthalic acid esters, are widely used as plasticizers for synthetic resins. Metal salts of the branched-chain $C_5$ to $C_{10}$ carboxylic acids may be used as siccatives in the coating field, as catalysts for synthesis operations, and the acids themselves are suited as esterification components for monohydric and polyhydric alcohols and many other purposes.

In using the acids prepared in accordance with the invention, attention should be paid to the fact that an isomeric mixture of branched-chain acids is always involved. Thus, for example, 3,5,5-trimethyl hexanoic acid is obtained as the main product when preparing isomeric $C_9$ carboxylic acid from di-isobutylene. In addition, several isomers are present.

From n-heptene, a mixture of caprylic acid and α-methyl-iso-hexanoic acid is obtained.

The following examples are given by way of illustration and not limitation.

*Example 1*

Catalytic addition of water gas to di-isobutylene and subsequent treatment of the reaction mixture with water under pressure resulted in a practically metal-free and acetal-free raw aldehyde having the following characteristics:

Carboxyl number (CON) _____ 250
Hydroxyl number (OHN) _____ 61
Iodine number (IN) _____ 14
Neutralization number (NN) _____ 4.9
Saponification number (SN) _____ 14.5

1142 kg. of this raw aldehyde product were charged into a still of 2 m.³ capacity, provided with a column having a length of 4 m., and the aldehyde product was distilled therein. The results of the distillation are set out in Table II, which follows:

TABLE II

| Fraction | Head Temp., °C. | Pressure, mm. Hg | Distillate, weight-percent | IN | NN | SN | CON | OHN |
|---|---|---|---|---|---|---|---|---|
| 1 | 41–62 | 300 | 16.3 | 41 | 0.5 | 0.5 | 0 | 4 |
| 2 | 63–83 | 50 | 5.2 | 48 | 0.9 | 15.5 | 216 | 16 |
| 3 | 83–85 | 50–40 | 42.5 | 0.7 | 4.1 | 8.8 | 385 | 9 |
| 4 | 80–85 | 40 | 3.8 | | | | 316 | |
| Residue | 85 | 40 | 30.7 | 6.4 | 3.4 | 41.1 | 36 | 143 |

For the production of the branched nonanoic acid, use was made of fraction 3, while fractions 1, 2, 4 and the residue was recycled to the process cycle for the production of iso-nonanol.

The oxidation of the aldehyde fraction 3 was effected in a glass tube having a length of 2 m. and an inside diameter of 25 mm. which was constricted towards the center by indentation provided at distances of 15 cm. These indentations served the purpose of largely preventing the downflowing aldehyde material, which was being oxidized, from running down along only the wall. The tube was packed with granular pumice of 2 to 5 mm. particle size. The tube was surrounded by a cooling jacket which was filled with water maintained at 80° C. and which was regulated by a thermostat. The aldehyde was charged to the top of the tube at a rate of 220 g. per hour by means of a metering pump constructed of glass. At the same time, air at a rate of 98 liters per hour was introduced into the bottom of the reaction tube. At this air rate, 70–80% of the oxygen present in the air was consumed in the reaction. The oxidation product was withdrawn from the base of the oxidation tube and distilled from time to time in a glass column having a length of 1 m., which was filled with packing rings.

The acid fraction recovered amounted to 74.6% by weight of the oxidation product charged and had the following characteristics:

Neutralization number _____ 347 (theoretically 354).
Saponification number _____ 347.
Boiling range _____ 115–124° C. at 10 mm. Hg.

All of the other fractions recovered from the distillation including the residue were returned into the process for preparation of iso-nonanol.

In runs repeated substantially as described above, the oxidation was effected continuously at temperatures of 95, 110 and 65° C. The yields of nonanoic acid, hydrocarbons and unconverted $C_9$ aldehyde obtained in these runs are set out in Table I.

*Example 2*

A glass tube having a length of 50 cm. and an inside diameter of 2 cm., filled with 140 ccm. of "Stuttgart mass" of 2.5–5 mm. particle size, was charged at the top with $C_9$ aldehyde at a rate of 50 ccm. per hour, while air was injected at a rate of 25 liters per hour at the base of the tube. The reaction product was continuously withdrawn from the bottom of the tube, while the vent gas was taken off at the top of the tube via a condensing trap. The reaction tube was surrounded by a tubular jacket wherein the temperature was maintained at 80° C. by circulating oil. The temperature in the reaction tube was 100–105° C.

The oxidation product flowing off at the base of the tube was combined with the product obtained from the vent gas in the condensing trap and had the following characteristics:

Neutralization number _____ 251
Saponification number _____ 276
Carboxyl number _____ 92

Distillation in vacuo of this product resulted in the recovering of the following fractions;

| | Percent |
|---|---|
| Iso-nonanoic acids | 70.8 |
| Unconverted iso-$C_9$ aldehyde | 15.2 |
| Hydrocarbons | 8.5 |
| Distillation residue | 5.5 |

*Example 3*

A tube having a length of 50 cm. and an inside diameter of 3 cm., which was filled with 10 g. of strips of a cotton fabric and which was surrounded by a heatable tubular jacket, was charged at the top with $C_9$ aldehyde at a rate of 80 g. per hour. The charging was effected so that the aldehyde trickled down along the strips of fabric. Air at a rate of 30–40 liters per hour was introduced at the base and passed in counter-current to the liquid product. Oil maintained at 90° C. was recirculated through the tubular jacket. The air vented at the top entrained 5% of the total reaction product. These portions were condensed in condensing traps and mainly consisted of $C_8$ hydrocarbons. The oxidation product flowing off at the base of the tube had the following characteristics:

Neutralization number _____ 307
Saponification number _____ 320

By subsequent distillation in vacuo of this product there were obtained the following fractions:

| | Percent |
|---|---|
| Iso-nonanoic acids | 86.4 |
| Iso-$C_9$ aldehydes | 4.5 |
| Hydrocarbons | 6.0 |
| Residue | 3.1 |

*Example 4*

A tube having a length of 2 m. and an inside diameter of 2.5 cm., which was surrounded with a heatable tubular jacket and maintained at a jacket temperature of 80° C., was charged at the top with a pure $C_9$ aldehyde dropped in at a rate of 200 ccm. per hour, while air at a rate of 70 liters per hour was injected at the base through a fritted glass sparger (Jena glass frit of G 2 pore size). The tube contained 250 ccm. of liquid oxidation mixture which, except for a small part, was converted by the air flowing through into a foam which occupied the entire tube. By virtue of dropping in the $C_9$ aldehyde at the top, the foam was forced down to a level sufficiently low to prevent the foam from entering the vent gas line at the top of the tube together with the air flowing off. The height of the column of foam was satisfactorily adjustable by means of the flow rate of the air introduced at the bottom and the quantity of aldehyde added at the top. Liquid reaction product was withdrawn at a level somewhat above the fritted glass sparger at a rate equal to that of the aldehyde added at the top of the tube, so that the quantity of liquid contained in the reaction tube was always the same. The oxidation product withdrawn at the base had the following characteristics:

Neutralization number _____ 265
Saponification number _____ 275
Carboxyl number _____ 74

Processing of this product by distillation yielded the following fractions:

| | Percent |
|---|---|
| Hydrocarbons | 7.8 |
| Aldehydes | 13.9 |
| Acids | 74.5 |
| Distillation residue | 3.8 |

*Example 5*

300 ccm. per hour of a hydrocarbon $C_9$ aldehyde mixture was introduced dropwise at the top of the apparatus used in Example 1, packed with pumice of 2–5 mm. particle size and maintained at a jacket temperature of 80° C. At the same time, air at a rate of 80 liters per hour was passed through the tube from the top. The mixture of hydrocarbon and $C_9$ aldehyde had been obtained as the distillate in the continuous distillation of the raw $C_9$ aldehyde mixture obtained by catalytic addition of water gas to di-isobutylene. The mixture contained 70% of $C_9$ aldehydes and 30% of $C_8$ hydrocarbons. The oxidation product continuously withdrawn at the base of the tube gave the following fractions when processed by distillation:

| | Percent |
|---|---|
| Hydrocarbons | 26 |
| i$C_9$ aldehydes | 20 |
| i$C_9$ acids | 51 |
| Distillation residue | 3 |

The i$C_9$ aldehyde could be re-used as starting product of the oxidation.

*Example 6*

Distillation of a raw $C_8$ aldehyde obtained by catalytic addition of water gas to a $C_7$ olefin mixture yielded a $C_8$ aldehyde fraction having the following characteristics:

Boiling range _____ 103–110° C. at 100 mm. Hg.
Carboxyl number _____ 377.
Hydroxyl number _____ 60.
Neutralization number _____ 6.4.
Saponification number _____ 11.2.

This fraction, which approximately contained 85% of $C_8$ aldehyde and 14% of $C_8$ alcohol, was subjected to oxidation with air, effected in the manner described in Example 1, in a glass tube having a length of 2 m. under the following conditions:

Packing of glass tube _____ Granular pumice of 2–5 mm. particle size.
Temperature _____ 85° C.
Aldehyde flow rate _____ 150 g. per hour.
Air flow rate _____ 100 liters per hour.

The oxidation product continuously withdrawn at the base of the oxidation tube had the following characteristics:

Neutralization number _____ 272
Saponification number _____ 303
Carboxyl number _____ 89
Hydroxyl number _____ 23

Distillation of this oxidation product in a glass column having a length of 1 m. and packed with Raschig rings yielded the following fractions:

Hydrocarbons __ 6%, B.P. 65–110° C. at 760 mm. Hg.
$C_8$ aldehydes ___ 20%, B.P. 85–110° C. at 100 mm. Hg.
$C_8$ alcohols ____ 4%, B.P. 110–130° C. at 100 mm. Hg.
$C_8$ acid _____ 65%, B.P. 150–170° C. at 100 mm. Hg.
Distillation
 residue _____ 5%.

The $C_8$ acid fraction obtained comprised 94–95% of $C_8$ acid and had the following characteristics:

Density at 20° C. _____ 0.913
Refractive index, $n_D^{20}$ _____ 1.4300
Neutralization number _____ 368
Saponification number _____ 374
Hydroxyl number _____ 1
Carboxyl number _____ 1.1

*Example 7*

From a raw $C_{10}$ aldehyde obtained by catalytic addition of water gas to tripropylene there was separated by distillation a $C_{10}$ aldehyde fraction having the following characteristics:

Carboxyl number _____ 284
Hydroxyl number _____ 49
Neutralization number _____ 3.4
Saponification number _____ 22

The $C_{10}$ aldehyde fraction which comprised about 79% of $C_{10}$ aldehyde and 14% of $C_{10}$ alcohol was oxidized with air by the procedure described in Example 1, using the following conditions:

Packing of oxidation tube ____ Granular pumice of 2–5 mm. particle size.
Temperature _____ 85° C.
Aldehyde flow rate _____ 150 g. per hour.
Air flow rate _____ 100 liters per hour.

The reaction product obtained upon oxidation and continuously withdrawn at the base of the tube had the following characteristics:

Neutralization number _____ 212
Saponification number _____ 236
Carboxyl number _____ 76
Hydroxyl number _____ 22

Distillation of this product in a column having a length of 1 m. and packed with Raschig rings yielded the following fractions:

Hydrocarbons _____ 5%, B.P. 80–110° C. at 100 mm. Hg.
$C_{10}$ aldehyde-$C_{10}$ alcohol fraction _____ 30%, B.P. 83–150° C. at 50 mm. Hg.
$C_{10}$ acid fraction _____ 59%, B.P. 140–160° C. at 50 mm. Hg.
Residue _____ 6%.

The $C_{10}$ acid fraction obtained comprised 90% of pure $C_{10}$ acid and had the following characteristics:

Density at 20° C. _____ 0.904
Refractive index, $n_D^{20}$ _____ 1.4368
Neutralization number _____ 319
Saponification number _____ 329
Carboxyl number _____ 7.8
Hydroxyl number _____ 0.0

*Example 8*

In an autoclave, 200 ml. of a $C_6$ olefin having the following characteristics:

Density at 20° C. _____ 0.676
Refractive index, $n_D^{20}$ _____ 1.3896
Iodine number _____ 273
Boiling range _____ ° C__ 67–68 together with 7.2 grams of dry cobalt carbonate were heated for 1 hour at 170° C. under a water gas pressure of 250 kgs./cm.$^2$ while stirring. The pressure was maintained at 250 kgs./cm.$^2$ by supplying additional water gas. Upon cooling, the pressure was released, 10% by volume of water added to the oxidation product and the latter heated for 2 hours at 190° C. The raw aldehyde was freed from precipitated metallic cobalt by filtration and, after separation of water, distilled in a fractionating column resulting in the following fractions:

Percent
Hydrocarbon fraction (57–132° C. at 760 mm. Hg) __ 10
$C_7$ aldehyde fraction (79–90° C. at 100 mm. Hg) ___ 55
Distillation residue (comprising 75% of $C_{7-10}$ and 25% of higher boiling products) (90° C. at 100 mm. Hg) _____ 35

By the procedure and with the apparatus described in Example 4, the $C_7$ aldehyde fraction was oxidized with an air-oxygen mixture under the following conditions:

Filling of the tube _____ 250 ml.
Aldehyde feed rate _____ 200 ml./hr. of $C_7$ aldehyde.
Feed gas _____ 70 l./hr. of a 1:1 mixture of air and oxygen.
Temperature _____ 80° C.

With 250 cm.$^3$ of oxidation product contained in the tube, the filling was converted by the injected feed gas into a column of foam from which about 200 ml./hr. of oxidation product corresponding to the feed rate was continuously withdrawn. About 2% of the reaction product was entrained with the vent gas. The oxidation product continuously withdrawn at the base had the following characteristics:

Neutralization No. _____ 353
Saponification No. _____ 383
Carboxyl No. _____ 65

Subsequent distillation in a fractionating column resulted in the following fraction:

Percent
$C_7$ acid (156–160° C./100 mm. Hg) _____ 72
$C_6$ hydrocarbons (70° C./760 mm. Hg) _____ 5
$C_7$ aldehyde (80–90° C./100 mm. Hg) _____ 18
Residue _____ 5

The $C_7$ acid had the following characteristics:
Density at 20° C. _____ 0.917.
Refractive index, $n_D^{20}$ _____ 1.4227.
Neutralization No. _____ 411 (calculated for 100% acid, 430).
Saponification No. _____ 419.
Carboxyl No. _____ 4.0.

In view of the neutralization number found, the purity was in excess of 95%.

*Example 9*

A raw aldehyde obtained by catalytic addition of water gas to cyclopentene and treated with water under pressure at 190° C. was distilled. There was obtained a cyclopentane methylal fraction having the following characteristics:

Boiling range _____ 75–82° C./100 mm. Hg.
Carboxyl No. _____ 445.
Hydroxyl No. _____ 80.
Neutralization No. _____ 10.
Saponification No. _____ 20.

This fraction was oxidized with an air-oxygen mixture using the same apparatus and the same procedure as described in Example 4, the conditions being as follows:

Filling of the tube _____ 250 ml.
Aldehyde feed rate _____ 200 ml./hr.
Feed rate of treating gas __ 80 liters/hr. of a 1:1 mixture of air and oxygen.
Temperature _____ 80° C.

The oxidation product which was continuously withdrawn at the base had the following characteristics:

| | |
|---|---|
| Neutralization No. | 319 |
| Saponification No. | 359 |
| Hydroxyl No. | 35 |
| Carboxyl No. | 106 |

Distillation in a fractionating column resulted in the following products:

| | Percent |
|---|---|
| Hydrocarbons (40–100° C./760 mm. Hg) | 15 |
| Cyclopentane carboxylic acid (106–107° C./10 mm. Hg) | 60 |
| Cyclopentane methylal and methylol (75–110° C./100 mm. Hg) | 20 |
| Residue | 5 |

A 94% purity results from the following characteristics of the cyclopentane carboxylic acid fraction:

| | |
|---|---|
| Density at 20° C. | 1.045. |
| Refractive index, $n_D^{20}$ | 1.4546. |
| Neutralization No. | 462 (calculated for 100% acid, 491). |
| Saponification No. | 472. |

*Example 10*

Distillation of a hydrated $C_5$ raw aldehyde obtained by catalytic addition of water gas to butylene in the presence of a cobalt sulfate solution resulted in a $C_5$ aldehyde fraction having the following characteristics:

| | |
|---|---|
| Density at 20° C. | 0.809 |
| Refractive index, $n_D^{20}$ | 1.3920 |
| Carboxyl No. | 645 |
| Iodine No. | 1 |
| Neutralization No. | 2.2 |

By the procedure and with the apparatus described in Example 4, this aldehyde fraction was oxidized with an air-oxygen mixture under the following conditions:

| | |
|---|---|
| Filling in the tube | 250 ml. |
| Aldehyde feed rate | 200 ml./hr. |
| Gas feed rate | 100 liters/hr. of 1:1 mixture of air and oxygen. |
| Temperature | 80° C. |

The oxidation product continuously withdrawn had the following characteristics:

| | |
|---|---|
| Neutralization No. | 480 |
| Saponification No. | 506 |
| Carboxyl No. | 65 |

About 5% of the reaction product was entrained and carried out as butane with the vent gas. Distillation in a fractionating column resulted in the following products:

| | Percent |
|---|---|
| $C_5$ acid (175–186° C./760 mm. Hg) | 80 |
| $C_5$ aldehyde (85–104° C./760 mm. Hg) | 12 |
| Residue | 8 |

We claim:

1. In a process for the production of mixtures of isomeric carboxylic acids of $C_5$ to $C_{10}$ molecular size by subjecting an olefin selected from the group consisting of aliphatic olefins of $C_4$ to $C_9$ molecular size and cycloaliphatic olefins of $C_4$ to $C_9$ molecular size to a catalytic addition of carbon monoxide and hydrogen and thereafter treating the resultant mixture of aldehydes of $C_5$ to $C_{10}$ molecular size in the liquid phase with oxygen-containing gases, the improvement which comprises passing an at least partially purified aldehyde synthesis product in the form of a thin film into a reaction zone under conditions whereby the surface area of said aldehyde is substantially increased, passing an oxygen-containing gas in contact with said thin film of aldehyde, said contacting being effected in the absence of any oxidation catalyst and at a temperature of between about 65 and 110° C. and recovering the isomeric mixture of carboxylic acids of $C_5$ to $C_{10}$ molecular size formed.

2. Process according to claim 1, wherein said aldehyde synthesis product has been at least partially purified by a hydration treatment with water under pressure.

3. Process according to claim 1, wherein said aldehyde synthesis product has been at least partially purified by distillation of the raw aldehyde synthesis fraction.

4. Process according to claim 1, which comprises passing said aldehyde into said reaction zone at a rate which corresponds to 10–60% by volume of the reaction zone.

5. Process according to claim 1, which comprises effecting the reaction at temperatures of from 80–100° C.

6. Process according to claim 1, which comprises effecting the oxidation by passing the aldehyde fraction to be oxidized over and in contact with a fixed bed of inert filling bodies maintained in the reaction zone.

7. Process according to claim 6, wherein said inert filling bodies are a member selected from the group consisting of pumice, asbestos, glass wool, ceramics, porous ceramics, silica gel, coke, carbon, cellulose, paper, cotton, cotton wool, cotton fabric and porous synthetic resins.

8. Process according to claim 6, which comprises passing said aldehyde into said reaction zone at a rate which corresponds to 10–60% by volume of the reaction zone.

9. Process according to claim 1, which comprises effecting the oxidation by passing the aldehyde fraction to be oxidized in contact with and through a column of foam formed from the oxidation product and the oxidizing gas.

10. Process according to claim 9, which comprises passing said aldehyde into said reaction zone at a rate which corresponds to 10–60% by volume of the reaction zone.

11. Process according to claim 1, wherein said oxidizing gas is a member selected from the group consisting of air, oxygen-enriched air and oxygen.

12. Process according to claim 1, which comprises passing said oxidizing gas in contact with said aldehyde film in co-current flow relationship therewith.

13. Process according to claim 1, which comprises passing said oxidizing gas in contact with said aldehyde film in counter-current flow relationship therewith.

14. Process according to claim 6, which comprises passing said oxidizing gas in contact with said aldehyde film in co-current flow relationship therewith.

15. Process according to claim 9, which comprises passing said oxidizing gas in contact with said aldehyde film in counter-current flow relationship therewith.

16. Process according to claim 15, which comprises passing said oxidizing gas in counter-current contact with said aldehyde at a rate sufficient to form a column of foam formed of the oxidizing gas and the oxidation product of said aldehyde and maintaining the height of the column of foam constant by the addition of aldehyde.

17. Process according to claim 1, which comprises maintaining the reaction temperature within the desired range by addition of a diluent for the aldehyde, said diluent boiling at a temperature of between 75 and 100° C.

18. Process according to claim 17, wherein said diluent for the aldehyde is a hydrocarbon separated from the aldehyde-hydrocarbon mixture of the oxo synthesis product at appropriate fractionation temperatures.

19. Process according to claim 1, wherein said aldehyde is continuously passed into said reaction zone and said mixture of carboxylic acids formed therefrom is continuously removed from said reaction zone.

References Cited in the file of this patent

UNITED STATES PATENTS

| | | |
|---|---|---|
| 2,828,337 | Whitaker | Mar. 25, 1958 |
| 2,876,241 | Koch et al. | Mar. 3, 1959 |